United States Patent [19]

Mohamed

[11] Patent Number: 5,287,826
[45] Date of Patent: Feb. 22, 1994

[54] METHOD FOR MODIFYING THE ESCRETORY BEHAVIOR OF AN ANIMAL SUCH AS A DOG

[75] Inventor: Mirza A. Mohamed, West Monroe, La.

[73] Assignee: Board of Supervisors of Lousiana State University and Agricultural and Mechanical College, Baton Rouge, La.

[21] Appl. No.: 64,371

[22] Filed: May 19, 1993

Related U.S. Application Data

[63] Continuation of Ser. No. 862,791, Apr. 3, 1992, abandoned.

[51] Int. Cl.$^5$ .............................................. A01K 29/00
[52] U.S. Cl. .................................... 119/712; 119/174; 119/168
[58] Field of Search ............... 119/29, 29.5, 174, 171, 119/172, 173, 169; 424/405

[56] References Cited

U.S. PATENT DOCUMENTS

| | | | |
|---|---|---|---|
| 3,286,691 | 11/1966 | McFadden | 119/1 |
| 3,339,527 | 9/1967 | Burroughs | 119/1 |
| 3,626,899 | 12/1971 | Spellman | 119/1 |
| 3,972,971 | 8/1976 | Dantoni | 264/115 |
| 4,263,873 | 4/1981 | Christianson | 119/1 |
| 4,715,320 | 12/1987 | Barnhart | 119/1 |
| 4,800,677 | 1/1989 | Mack | 119/1 |
| 4,840,792 | 6/1989 | Joulain et al. | 424/405 |
| 5,058,533 | 10/1991 | Nelson | 119/173 |
| 5,107,037 | 4/1992 | Naegeli | 568/819 |

FOREIGN PATENT DOCUMENTS 9104657  4/1991  World Int. Prop. O. .......... 119/174

*Primary Examiner*—John G. Weiss
*Attorney, Agent, or Firm*—John H. Runnels

[57] ABSTRACT

A method or kit for modifying the excretory behavior of animals such as dogs. It has been discovered that placing β-ionone in a particular location induces dogs to urinate and defecate preferentially at or near that location. Related compounds which may also be useful, in lieu of β-ionone, or as synergists, are also disclosed.

17 Claims, No Drawings

METHOD FOR MODIFYING THE ESCRETORY BEHAVIOR OF AN ANIMAL SUCH AS A DOG

This application is a continuation of copending application Ser. No. 07/862,791, filed Apr. 3, 1992, now abandoned.

This invention pertains to modifying the excretory behavior of animals, particularly the excretory behavior of dogs, and particularly through the use of β-ionone or related compounds.

The desirability of a method of easily modifying the urinary and defecatory behavior of animals such as dogs requires no citation, as anyone who has ever raised or housebroken a puppy can attest. Much unnecessary grief, anguish, and effort would be saved with an easy-to-use method for inducing an animal such as a dog to excrete only in one or more desired locations.

McFadden, U.S. Pat. No. 3,286,691 discloses an animal litter containing a grass or legume material such as alfalfa.

Spellman, U.S. Pat. No. 3,626,899 discloses a training pad for housebreaking young dogs. The pad is impregnated with allyl phenyl acetate, which is said to attract young dogs to the pad for the purpose of urination or defecation, but not to attract mature, housebroken dogs.

Dantoni, U.S. Pat. No. 3,972,971, discloses an animal litter containing peanut hulls and a chlorophyll-containing material such as alfalfa, broom grass, or straw.

Burroughs, U.S. Pat. No. 3,339,527, discloses an animal toilet in which a refill unit is optionally impregnated with evergreen odor as an inducement to dogs.

Christianson, U.S. Pat. No. 4,263,873 discloses an animal litter containing an unspecified pheromone-like attractant substance.

Barnhart, U.S. Pat. No. 4,715,320 discloses a sanitary receptacle for animal waste matter in which the interior section is optionally scented with a urine-fecal scent.

Mack, U.S. Pat. No. 4,800,677 discloses an animal waste collection pad which may be scented with pine, urea, or ammonia to induce defecation or urination by a dog.

Nelson, U.S. Pat. No. 5,058,533 discloses the use of an animal litter mixed with a rosin oil, or the use of rosin oil alone, as an attractant to an animal seeking a place to defecate or urinate.

There remains an unfilled need for a method of easily controlling the excretory behavior of animals, particularly that of dogs, especially a method which may be used outdoors, and without the need for special equipment, pads, or litter.

It has been discovered, quite serendipitously, that the compound β-ionone dramatically affects the excretory behavior of certain animals, including dogs. This compound may be used outdoors and requires no special equipment, pads, or litter. It induces animals such as dogs to excrete preferentially in locations where the compound is placed.

In the course of an unrelated investigation into the defensive allelochemistry of bermudagrass (*Cynodon dactylon*), a secondary metabolite was isolated and identified as 4-[2,6,6-trimethyl-1-cyclohexen-1-yl]-3-buten-2-one (also called β-ionone). During the handling of this compound, a small quantity apparently contaminated the inventor's fingernails. Later contact with the inventor's two pet Alaskan dogs elicited an acute olfactory response from the dogs at the exact location of contamination. To test the effects of the compound on the dogs' behavior, the inventor placed a sample of the compound on a spot on his porch, and observed the dogs' reaction. A similar olfactory response was noted at the location where the compound had been placed. Quite unexpectedly, the dogs then began preferentially using this site to urinate and defecate.

Several controlled experiments were then conducted to assess the excretory behavior-modifying property of this compound on dogs.

Bermudagrass (line OSU 71×6-7) was harvested from greenhouse cultures, oven dried (60° C.), and milled (Wiley Mill, 1 mm sieve). Crude extracts were prepared from Sohxlet extraction with ether, and then with methanol (Nanograde, distilled in glass), using 120 g of dried grass. The pooled extract was then filtered through anhydrous $Na_2SO_4$, and concentrated with a rotary evaporator under reduced pressure. The concentrated material was flash column chromatographed on 180 g of silica gel 60. Fractions were eluted with hexane, 50% $CH_2Cl_2$/hexane, $CH_2Cl_2$, 10% EtOAc/$CH_2Cl_2$, EtOAc, and MeOH. Components of the $CH_2Cl_2$ fraction (characterized by a strong grassy odor scent) were further separated by reverse phase preparative high pressure liquid chromatography (30×300 mm, 100 Å, C18 Delta Pak column, with MeOH at 80 ml/min, 210 psi at 254 nm on a Waters Millipore HPLC). Further separation on a C18 Novapak reverse phase column (4μ, 0.8×10 cm Radial Pak cartridge, 0.5 ml/min. 20% MeOH/$CH_3CN$) allowed isolation of β-ionone at 17.6 min.

Fractionated samples were analyzed by Gas/Liquid Chromatography apparatus equipped with a flame ionization detector to monitor the purification of β-ionone. A single major peak was observed at $R_t$=10.18 minutes with a 30 m DB-5 megabore capillary column (1.5 μm film, J&W) used with the following temperature program: 50° C. for 1.0 min., 20° C. to 200° C. and hold, with a helium flow rate of 6 ml/min. The final identification of the compound was based on an electron impact mass spectrum (70 eV) from which β-ionone ($C_{13}H_{20}O$, Mr 192) was deduced to be the best structural fit, based on the various fragments of the parent molecular ion (for example, M-15, loss of $CH_3$; M-33, oxygen indicator; and, M-43, methyl ketone), and based on the best fit to published spectra. Finally, identical retention time and mass spectral patterns of the natural isolate from bermudagrass and those of a synthetic sample (Fluka Chemical Co.) unambiguously established that β-ionone was the compound isolated.

The structure of β-ionone is shown below:

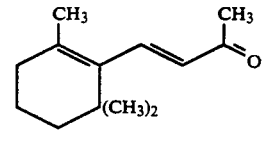

β-ionone

Alternatively, β-ionone is readily available commercially, or its synthesis may be performed through means known in the art, for example the synthesis from β-cyclocitral as described in Beilstein's Handbuch der Organischen Chem. VII, third supplemental volume, p. 634 (1968), the entire disclosure of which is incorporated by reference. Initially, the β-ionone used in the tests described below was that isolated from bermuda grass as described above. Later, synthetic β-ionone from Fluka Chemical Company was used instead.

Bioassays were conducted with randomly chosen dogs (both sexes and differing pedigrees) monitored for their behavioral responses to β-ionone. The frequency of urination and defecation were observed in an open arena in which certain defined areas had been treated with β-ionone. Preliminary bioassays conducted with β-ionone in a logarithmic progression of increasing concentrations, ranging from 0.0001–10 mg, indicated that a 0.05 mg–0.5 mg treatment, preferably a 0.1–0.2 mg treatment, elicited the most consistent spatial localization of excreta.

Several solvents, including methylene chloride, methanol, and water, were tested as diluents and delivery vehicles. Water and methanol appeared to be the best vehicles for delivering the β-ionone. Of the two, water is preferred because of possible toxicity concerns with methanol. Choice assays were conducted in sites treated with β-ionone (0.2 mg in 0.2 ml distilled water, adsorbed onto 2.5 g pure white quartz sand), typically with five dogs released into a 16 $m^2$ open arena. Control sites were treated with water. The frequencies of urination and defecation were recorded at each site after an hour. At the end of each experiment, the test arena was thoroughly washed and dried prior to further bioassays.

In six such independent assays, each using a concentration of 0.2 mg β-ionone dispensed in 0.2 ml water, individual dogs were found to defecate and urinate with a strong preference for sites where the compound was located. Typically, a dog's response was as follows: (1) sniffing in the area where the compound was located; (2) urination, typically within 15–30 min., at the location of the compound, generally not farther away than the length of the dog from that location; and (3) preferential defecation at the location. See Table 1, which gives results where the β-ionone was placed at each of four sites in the corners of a square in an open arena on four different days, with the location of the scented sites rotated between experiments.

TABLE 1

| Site | Localization of dog excreta at defined spatial sites scented with β-ionone Number of Excreta/Site | | | |
|---|---|---|---|---|
| | β-ionone scented | | Control | |
| | Urine | Faeces | Urine | Faeces |
| 1 | 7 | 10 | 0 | 0 |
| 2 | 8 | 6 | 1 | 0 |
| 3 | 4 | 7 | 0 | 1 |
| 4 | 2 | 8 | 1 | 0 |

The dogs unambiguously located each site scented with β-ionone when the sites were switched from one corner to another. Repeated testing of the same groups of animals in two independent experiments at an optimal dosage of 0.2 mg over a four-day period indicated no decrease in these responses at the scented sites. In particular, there was no decrease in the localization of excreta. See Table 2, which reports results where the β-ionone was placed at sites on the corners of a square in an open arena over the course of four days. Dogs were non-responsive to controls composed of water/sand alone each day the experiment was conducted (controls not shown in Table 2). Note: urine in experiment 2, day 4 could not be counted due to heavy rainfall.

TABLE 2

| Day | Time-dependent response of two sets of dogs to β-ionone in two independent experiments. Number of Excreta/Day at Site Treated with β-ionone | | | |
|---|---|---|---|---|
| | Experiment 1 | | Experiment 2 | |
| | Urine | Faeces | Urine | Faeces |
| 1 | 1 | 2 | 3 | 4 |
| 2 | 2 | 1 | 4 | 3 |
| 3 | 3 | 2 | 2 | 3 |
| 4 | 4 | 6 | * | 7 |

Although no compounds other than β-ionone had been tested in the method of this invention as of the date this application was filed, other related compounds are expected to work in this invention also, either in lieu of β-ionone, or as a synergist. Such compounds may readily be tested for efficacy in the same manner as described above for β-ionone.

To this end, experiments are planned with one or more of the following related compounds:

(1) α-ionone, an isomer of β-ionone:

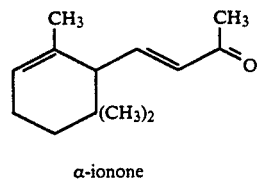

α-ionone (2) The reduction product of β-ionone or α-ionone to dihydro-β-ionol or dihydro-α-ionol, respectively. This reduction will likely be performed with sodium in tetrahydrofuran/t-butanol.

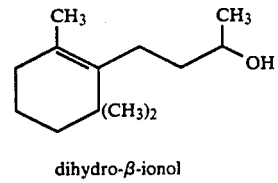

dihydro-β-ionol

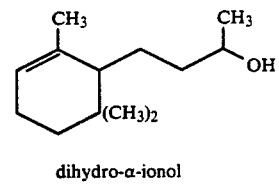

dihydro-α-ionol (3) The oxidation product of either of the above two dihydro-ionols to dihydro-β-ionone or dihydro-α-ionone, respectively. This oxidation will likely be performed with Jones reagent.

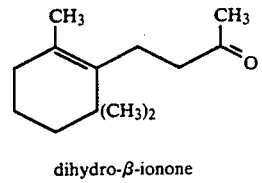

dihydro-β-ionone

-continued

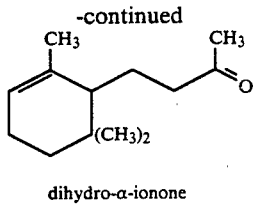

dihydro-α-ionone (4) Substitution of the methyl substituent which is adjacent to the ketone group or to the alcohol group on any of the above compounds with another alkyl substituent such as an ethyl, propyl, isopropyl, butyl, isobutyl, s-butyl, or t-butyl group (this replacement alkyl substituent is labelled R in the following structures):

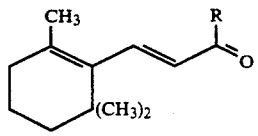

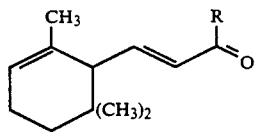

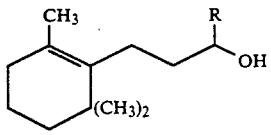

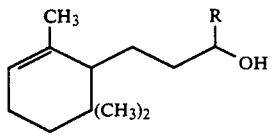

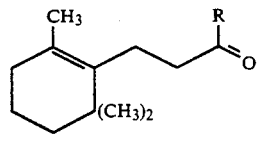

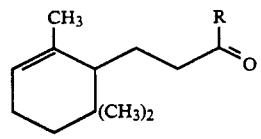

The various alkyl-substituted ionones shown above may be prepared by the condensation of citral with the appropriate acyclic ketone under alkaline conditions, or by oxidation of the corresponding alkyl-substituted ionol. The various alkyl-substituted ionols shown above may be prepared from the corresponding substituted ionone by reduction, such as that described above for the dihydro-ionols.

Also intended to be included within the scope of this invention is the use of any modification of any of the compounds discussed in this specification which would occur to the worker of ordinary skill in the art, where the modification is a compound which is readily available commercially, or which may be readily synthesized through means known in the art, and where the modified compound has activity in modifying the excretory behavior of animals. It may be desirable to impregnate or formulate this material into a slow-release medium, such as an inert polymer or hollow fiber; or to make chemical modifications or mixtures with additives to help make the material environmentally stable. Such polymers might be molded, for example, into a dish shape to make cleanup easer, and enhance portability of the device.

Although this invention had not been tested on animals other than dogs as of the date this application was filed, one of ordinary skill in the art may readily use the inventor's disclosure to determine the efficacy of this invention with any other animal desired. In particular, experiments are planned to test the efficacy of this invention with cats.

I claim:

1. A method of modifying the excretory behavior of a dog, comprising the steps of:
   (a) selecting a location at which the dog does not preferentially excrete, but at or near which location it is desired that the dog should preferentially excrete; and
   (b) placing β-ionone at the selected location in an amount and for a time effective to cause the dog to excrete preferentially at or near that location;
   whereby the dog's behavior is modified so that the dog preferentially excretes at or near the selected location.

2. A method as recited in claim 1, wherein 0.05 mg to 0.5 mg β-ionone is placed at the location.

3. A method as recited in claim 2, wherein 0.1 to 0.2 mg β-ionone is placed at the location.

4. A method of modifying the excretory behavior of an animal, comprising the steps of:
   (a) selecting a location at which the animal does not preferentially excrete, but at or near which location it is desired that the animal should preferentially excrete; and
   (b) placing β-ionone at the selected location in an amount and for a time effective to cause the animal to excrete preferentially at or near that location;
   whereby the animal's behavior is modified so that the animal preferentially excretes at or near the selected location.

5. A method as described in claim 4, wherein the method is used to modify the excretory behavior of a cat.

6. A method of modifying the excretory behavior of an animal, comprising the steps of:
   (a) selecting a location at which the animal does not preferentially excrete, but at or near which location it is desired that the animal should preferentially excrete; and
   (b) placing a composition at the selected location in an amount and for a time effective to cause the animal to excrete preferentially at or near that location, said composition comprising one or more of the following compounds:

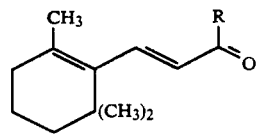

-continued

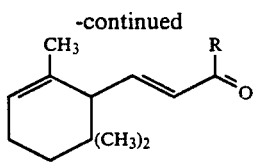

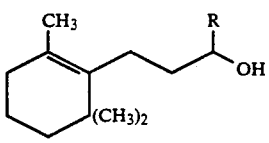

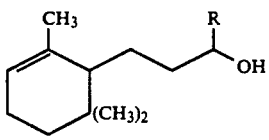

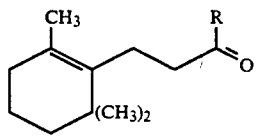

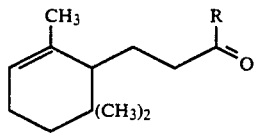

wherein R represents methyl, ethyl, propyl, isopropyl, butyl, isobutyl, s-butyl, or t-butyl;

whereby the animal's behavior is modified so that the animal preferentially excretes at or near the selected location.

7. A method as described in claim 6, wherein the method is used to modify the excretory behavior of a dog.

8. A method as described in claim 6, wherein the method is used to modify the excretory behavior of a cat.

9. A kit for modifying the excretory behavior of an animal, comprising:
   (a) a composition of matter comprising β-ionone; and
   (b) instructions for:
      (i) selecting a location at which the animal does not preferentially excrete, but at or near which location it is desired that the animal should preferentially excrete; and
      (ii) placing β-ionone at the selected location in an amount and for a time effective to cause the animal to excrete preferentially at or near that location.

10. A kit as described in claim 9, wherein the kit is a kit for modifying the excretory behavior of a dog, and wherein the kit comprises:
   (a) a composition of matter comprising β-ionone; and
   (b) instructions for placing said composition at one or more locations where excretion by the dog is desired.

11. A kit as described in claim 10, wherein said instructions describe a method for placing 0.05 mg to 0.5 mg β-ionone at each location where excretion by the dog is desired.

12. A kit as described in claim 11, wherein said instructions describe a method for placing 0.1 to 0.2 mg β-ionone at each loation where excretion by the dog is desired.

13. A kit as described in claim 9, wherein said composition comprises an aqueous solution of β-ionone.

14. A kit as described in claim 9, wherein said composition comprises a solution of β-ionone in methanol.

15. A kit for modifying the excretory behavior of an animal, comprising a composition and instructions for:
   (a) selecting a location at which the animal does not preferentially excrete, but at or near which location it is desired that the animal should preferentially excrete; and
   (b) placing the composition at the selected location in an amount and for a time effective to cause the animal to excrete preferentially at or near that location;

wherein said composition comprises one or more of the following compounds:

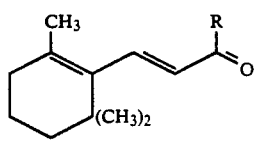

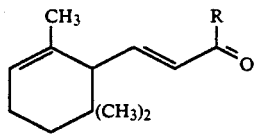

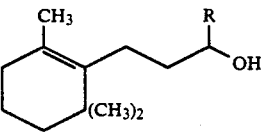

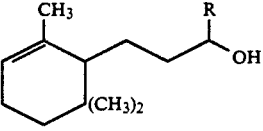

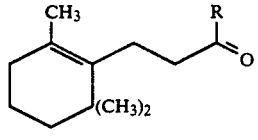

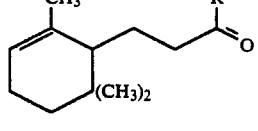

wherein R represents methyl, ethyl, propyl, isopropyl, butyl, isobutyl, s-butyl, or t-butyl.

16. A kit as recited in claim 15, wherein the kit is a kit for modifying the excretory behavior of a dog, and wherein said instructions comprise instructions for placing said composition at one or more locations where excretion by the dog is desired.

17. A kit as recited in claim 15, wherein the kit is a kit for modifying the excretory behavior of a cat, and wherein said instructions comprise instructions for placing said composition at one or more locations where excretion by the cat is desired.

* * * * *